US012573379B1

(12) United States Patent
    Badary

(10) Patent No.:    US 12,573,379 B1
(45) **Date of Patent:    *Mar. 10, 2026**

(54) SYSTEMS AND METHODS FOR GENERATING DISAMBIGUATED TERMS IN AUTOMATICALLY GENERATED TRANSCRIPTIONS INCLUDING INSTRUCTIONS WITHIN A PARTICULAR KNOWLEDGE DOMAIN

(71) Applicant: Suki AI, Inc., Redwood City, CA (US)

(72) Inventor: Ahmad Badary, Calgary (CA)

(73) Assignee: Suki AI, Inc., Redwood City, CA (US)

( * ) Notice:    Subject to any disclaimer, the term of this patent is extended or adjusted under 35 U.S.C. 154(b) by 165 days.

This patent is subject to a terminal disclaimer.

(21) Appl. No.: 18/418,096

(22) Filed:    Jan. 19, 2024

Related U.S. Application Data

(63) Continuation of application No. 18/188,333, filed on Mar. 22, 2023, now Pat. No. 11,881,208, which is a
(Continued)

(51) Int. Cl.
    *G10L 15/05*        (2013.01)
    *G10L 15/02*        (2006.01)
    (Continued)

(52) U.S. Cl.
    CPC ............ *G10L 15/063* (2013.01); *G10L 15/02* (2013.01); *G10L 15/05* (2013.01); *G10L 15/26* (2013.01);
    (Continued)

(58) Field of Classification Search
    CPC ....... G10L 15/26; G10L 15/02; G10L 15/063; G10L 15/22; G10L 15/1815; G10L 2015/025; G10L 2015/22; G10L 2015/0633; G10L 15/05; G10L 15/16; G10L 15/07; G10L 15/32; G10L 15/19;
    (Continued)

(56)        References Cited

U.S. PATENT DOCUMENTS

| | | | | | |
|---|---|---|---|---|---|
| 5,857,179 | A | * | 1/1999 | Vaithyanathan | ...... G06F 16/355 |
| 7,124,081 | B1 | * | 10/2006 | Bellegarda | .......... G10L 15/1815 704/E15.024 |

(Continued)

*Primary Examiner* — Vijay B Chawan
(74) *Attorney, Agent, or Firm* — Esplin & Associates, PC

(57)        ABSTRACT

System and method for generating disambiguated terms in automatically generated transcriptions including instructions within a knowledge domain and employing the system are disclosed. Exemplary implementations may: obtain a set of transcripts representing various speech from users; obtain indications of correlated correct and incorrect transcriptions of spoken terms within the knowledge domain; obtain a vector generation model that generates vectors for individual instances of the transcribed terms in the set of transcripts that are part of the lexicography of the knowledge domain; use the vector generation model to generate the vectors such that a first set of vectors and a second set of vectors are generated that represent the instances of the first correctly transcribed term and the first incorrectly transcribed term, respectively; and train the vector generation model to reduce spatial separation of vectors generated for instances of correlated correct and incorrect transcriptions of spoken terms within the knowledge domain.

20 Claims, 6 Drawing Sheets

Related U.S. Application Data continuation of application No. 17/557,901, filed on Dec. 21, 2021, now Pat. No. 11,615,783, which is a continuation of application No. 16/678,417, filed on Nov. 8, 2019, now Pat. No. 11,217,227.

(51) Int. Cl.
  *G10L 15/06* (2013.01)
  *G10L 15/26* (2006.01)
(52) U.S. Cl.
  CPC *G10L 2015/025* (2013.01); *G10L 2015/0633* (2013.01)
(58) Field of Classification Search
  CPC . G10L 2015/0631; G10L 15/08; G10L 15/14; G10L 15/187; G10L 15/20; G10L 15/30; G10L 2015/0635; G10L 15/1822; G10L 2015/085; G06F 40/30; G06F 40/247; G06F 40/232; G06F 40/211; G06F 40/284; G06F 40/242; G06F 40/35; G06F 16/3347; G06F 16/9535
  USPC ........................................................ 704/243
  See application file for complete search history.

(56) References Cited

U.S. PATENT DOCUMENTS

| | | | | |
|---|---|---|---|---|
| 7,353,164 | B1 | 4/2008 | Bellegarda | |
| 8,473,292 | B2 * | 6/2013 | Williams | G10L 15/07 704/250 |
| 9,454,966 | B2 * | 9/2016 | Williams | G10L 15/26 |
| 9,519,681 | B2 * | 12/2016 | Tunstall-Pedoe | G06N 5/022 |
| 9,589,578 | B1 * | 3/2017 | Dippenaar | H04L 67/10 |
| 9,959,328 | B2 * | 5/2018 | Jain | G06F 40/30 |
| 10,083,169 | B1 * | 9/2018 | Ghosh | G06N 3/084 |
| 10,629,193 | B2 * | 4/2020 | Ye | G10L 15/16 |
| 10,635,904 | B1 * | 4/2020 | Adler | G06V 20/182 |
| 10,679,008 | B2 * | 6/2020 | Dubey | G06F 16/3347 |
| 10,755,177 | B1 * | 8/2020 | Dabney | G06N 5/02 |
| 10,978,189 | B2 * | 4/2021 | White | G16H 10/60 |
| 11,132,610 | B2 * | 9/2021 | Overell | G06F 16/367 |
| 11,163,956 | B1 | 11/2021 | De Peuter | |
| 11,217,227 | B1 * | 1/2022 | Badary | G10L 15/26 |
| 11,538,465 | B1 * | 12/2022 | Badary | G10L 15/26 |
| 11,615,783 | B2 * | 3/2023 | Badary | G10L 15/26 704/243 |
| 11,798,537 | B2 * | 10/2023 | Badary | G06F 40/30 |
| 11,881,208 | B2 * | 1/2024 | Badary | G10L 15/02 |
| 2002/0111789 | A1 * | 8/2002 | Hull | G06F 40/44 704/4 |
| 2003/0204400 | A1 * | 10/2003 | Marcu | G06F 40/242 704/251 |
| 2004/0054533 | A1 * | 3/2004 | Bellegarda | G10L 15/187 704/254 |
| 2005/0049852 | A1 * | 3/2005 | Chao | G06F 40/30 704/9 |
| 2007/0033218 | A1 * | 2/2007 | Taylor | G06F 16/9535 707/999.102 |
| 2009/0063546 | A1 * | 3/2009 | Sullivan | G06F 40/242 707/999.102 |
| 2009/0248678 | A1 * | 10/2009 | Okamoto | G06F 16/355 707/999.005 |
| 2010/0217598 | A1 * | 8/2010 | Adachi | G10L 15/22 704/E15.005 |
| 2012/0330975 | A1 * | 12/2012 | Lee | G06F 16/435 707/E17.058 |
| 2013/0041857 | A1 * | 2/2013 | Medlock | G06F 40/274 706/14 |
| 2013/0110496 | A1 * | 5/2013 | Heidasch | G06F 40/247 704/E11.001 |
| 2013/0289985 | A1 * | 10/2013 | Williams | G10L 15/26 704/235 |
| 2015/0006157 | A1 * | 1/2015 | Andrade Silva | G06F 40/247 704/9 |
| 2015/0189088 | A1 * | 7/2015 | Surridge | G06Q 10/063112 379/265.12 |
| 2015/0193532 | A1 | 7/2015 | Romano | |
| 2015/0279358 | A1 * | 10/2015 | Kingsbury | G10L 15/02 704/257 |
| 2016/0336006 | A1 * | 11/2016 | Levit | G10L 15/063 |
| 2017/0011289 | A1 * | 1/2017 | Gao | G06F 40/268 |
| 2017/0031899 | A1 | 2/2017 | Lee | |
| 2017/0147910 | A1 * | 5/2017 | Mao | G06F 18/2413 |
| 2017/0286397 | A1 * | 10/2017 | Gonzalez | G06F 40/211 |
| 2017/0344530 | A1 * | 11/2017 | Krasadakis | G09B 19/00 |
| 2017/0351781 | A1 * | 12/2017 | Alexander | G06N 3/045 |
| 2018/0032874 | A1 * | 2/2018 | Sánchez Charles | G06N 7/01 |
| 2018/0130019 | A1 * | 5/2018 | Kolb | G06F 16/9535 |
| 2018/0137855 | A1 * | 5/2018 | Lee | G10L 15/16 |
| 2018/0157640 | A1 * | 6/2018 | Chung | G06F 40/56 |
| 2018/0157646 | A1 * | 6/2018 | Yang | G06F 16/90332 |
| 2018/0260381 | A1 | 9/2018 | Carreras | |
| 2018/0285448 | A1 * | 10/2018 | Chia | G06N 5/04 |
| 2018/0308487 | A1 * | 10/2018 | Goel | G10L 15/1815 |
| 2019/0013012 | A1 | 1/2019 | Hwang | |
| 2019/0043506 | A1 * | 2/2019 | Rivkin | G06N 3/08 |
| 2019/0057143 | A1 * | 2/2019 | Porter | G06F 16/285 |
| 2019/0065505 | A1 * | 2/2019 | Fukuda | G06F 16/243 |
| 2019/0139551 | A1 * | 5/2019 | Steelberg | G06N 20/00 |
| 2019/0154439 | A1 * | 5/2019 | Binder | G01S 15/42 |
| 2019/0197399 | A1 * | 6/2019 | Zhang | G06N 5/022 |
| 2019/0213601 | A1 * | 7/2019 | Hackman | G06N 3/044 |
| 2019/0266070 | A1 * | 8/2019 | Bhandarkar | G06F 11/3072 |
| 2019/0294678 | A1 * | 9/2019 | Sapugay | G06F 40/205 |
| 2019/0385610 | A1 * | 12/2019 | Steelberg | G10L 25/90 |
| 2020/0074242 | A1 * | 3/2020 | Chen | G06V 20/62 |
| 2020/0159829 | A1 | 5/2020 | Zhao | |
| 2020/0234009 | A1 * | 7/2020 | Uchide | G06F 40/237 |
| 2020/0285910 | A1 * | 9/2020 | Steelberg | G06F 18/285 |
| 2020/0286485 | A1 * | 9/2020 | Steelberg | G10L 15/063 |
| 2020/0349183 | A1 | 11/2020 | Jayaraman | |
| 2020/0372215 | A1 * | 11/2020 | Uchida | G06F 40/284 |
| 2020/0394620 | A1 * | 12/2020 | Kim | G06Q 20/02 |
| 2021/0004441 | A1 | 1/2021 | Sapugay | |
| 2021/0056168 | A1 * | 2/2021 | Bull | G06F 40/211 |
| 2021/0109958 | A1 * | 4/2021 | Behtash | G06F 18/214 |
| 2022/0115004 | A1 * | 4/2022 | Badary | G06F 40/232 |
| 2023/0088755 | A1 * | 3/2023 | Badary | G06F 40/30 704/235 |
| 2023/0230579 | A1 * | 7/2023 | Badary | G10L 15/02 704/243 |
| 2024/0135931 | A1 * | 4/2024 | Palos | G06V 20/20 |

* cited by examiner

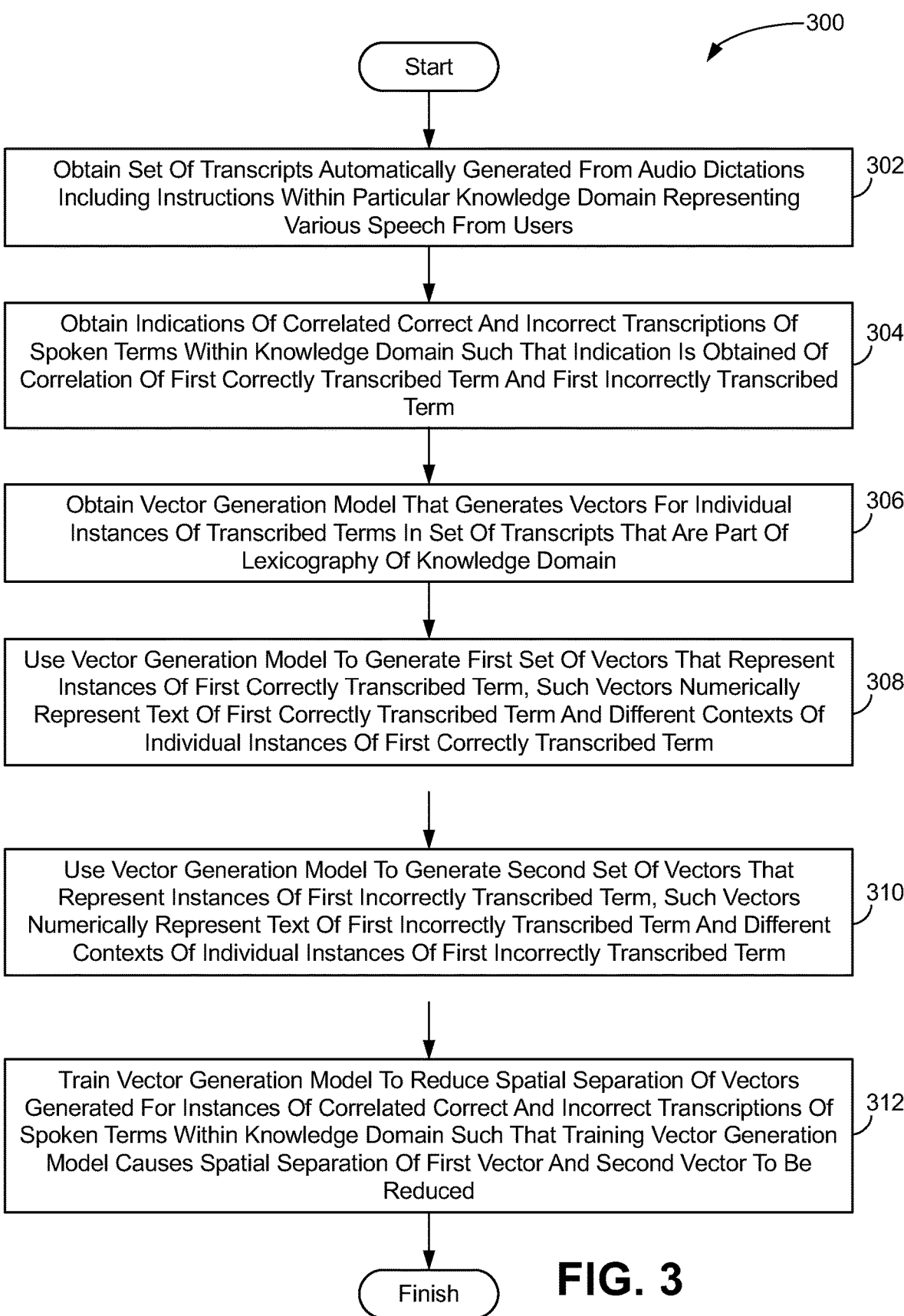

—300

Start

Obtain Set Of Transcripts Automatically Generated From Audio Dictations Including Instructions Within Particular Knowledge Domain Representing Various Speech From Users    302

Obtain Indications Of Correlated Correct And Incorrect Transcriptions Of Spoken Terms Within Knowledge Domain Such That Indication Is Obtained Of Correlation Of First Correctly Transcribed Term And First Incorrectly Transcribed Term    304

Obtain Vector Generation Model That Generates Vectors For Individual Instances Of Transcribed Terms In Set Of Transcripts That Are Part Of Lexicography Of Knowledge Domain    306

Use Vector Generation Model To Generate First Set Of Vectors That Represent Instances Of First Correctly Transcribed Term, Such Vectors Numerically Represent Text Of First Correctly Transcribed Term And Different Contexts Of Individual Instances Of First Correctly Transcribed Term    308

Use Vector Generation Model To Generate Second Set Of Vectors That Represent Instances Of First Incorrectly Transcribed Term, Such Vectors Numerically Represent Text Of First Incorrectly Transcribed Term And Different Contexts Of Individual Instances Of First Incorrectly Transcribed Term    310

Train Vector Generation Model To Reduce Spatial Separation Of Vectors Generated For Instances Of Correlated Correct And Incorrect Transcriptions Of Spoken Terms Within Knowledge Domain Such That Training Vector Generation Model Causes Spatial Separation Of First Vector And Second Vector To Be Reduced    312

Finish    FIG. 3

SYSTEMS AND METHODS FOR GENERATING DISAMBIGUATED TERMS IN AUTOMATICALLY GENERATED TRANSCRIPTIONS INCLUDING INSTRUCTIONS WITHIN A PARTICULAR KNOWLEDGE DOMAIN

FIELD OF THE DISCLOSURE

The present disclosure relates to systems and methods for generating and utilizing disambiguated terms in automatically generated transcriptions including instructions within a particular knowledge domain.

BACKGROUND

Personnel and other professionals of various industries may utilize speech recognition platforms to dictate, transcribe, and generate notes. The generated note may contain errors (e.g., mistranscriptions and/or user-made errors) and review teams of one or more persons may correct the errors.

SUMMARY

One aspect of the present disclosure relates to utilizing a trained model to predict a spoken term based on a mistranscription present in a transcript. The transcript may be derived from audio dictation of a user and automatically result from automatic speech recognition. Upon communication with the trained model, such mistranscription may be numerically represented by a generated vector. The trained model may obtain a set of vectors that represent the context of the incorrect transcription and include a correct vector representing the correct transcription. The trained model may numerically adjust the vector of the mistranscription to be comparable to the correct vector. Thus, upon comparing the set of vectors to the vector of the mistranscription, the trained model can predict that the vector of the mistranscription is equivalent to the correct transcription and replace the mistranslated term, for example.

Another aspect of the present disclosure relates to training the model. To train the model, various transcripts automatically generated from audio dictations representing various speech from users are obtained. The transcripts include both mistranscriptions of the spoken term and correct transcription of the spoken term. An indication of a correlation between the mistranscription and the correct transcription of the spoken term in the transcripts may be obtained (e.g., from a reviewing user). The correlation indicates what the mistranscription should be (the correct transcription). A first set of vectors is generated to numerically represent occurrences of the correct transcription in the transcripts and a second set of vectors is generated numerically represent occurrences of the mistranscription in the transcripts. Based on the indication of the correlation, the sets of vectors are adjusted to be comparable. Consequently, the mistranscription can be predicted to be equivalent to the correct transcription of the spoken term because the vectors are similar enough.

One aspect of the present disclosure relates to a system configured for utilizing a term prediction model to predict a spoken term based on a mistranscription of the spoken term. The system may include one or more hardware processors configured by machine-readable instructions. The machine-readable instructions may include one or more computer program components. The computer program components may include one or more of obtaining component, employ component, prediction component, and/or other components.

The obtaining component may be configured to obtain a transcript automatically generated from audio dictation of a user. The transcript may have resulted from automatic speech recognition. The transcript may include instances of transcribed terms automatically derived from the audio dictation as textual representations of spoken terms in the audio dictation. The transcribed terms may include an instance of an incorrectly transcribed term that inaccurately represents a spoken term.

The obtaining component may be configured facilitate communication with the term prediction model. The term prediction model may be configured to train a model to generate disambiguated terms in automatically generated transcriptions including instructions within a particular knowledge domain. The trained model may generate, via the term prediction model, a primary vector that numerically represents the text of the incorrectly transcribed term and context of the instance of the incorrectly transcribed term.

The employ component may be configured to obtain a first set of vectors that represent text of transcribed terms of the context of the instance of the first incorrectly transcribed term. The first set of vectors may be from the trained model of the term prediction model. The first set of vectors including a correct vector that numerically represents the text of a correctly transcribed term of the spoken term.

The prediction component may be configured to compare the primary vector and the correct vector to determine the primary vector correlates to the correct vector. The comparison may occur upon reduction of spatial separation of the primary vector and the correct vector via the term prediction model. The prediction component may be configured to store the correlation between the primary vector and the correct vector.

The prediction component may be configured to utilize the correlation between the primary vector and the correct vector. For example, the instance of the incorrectly transcribed term may be replaced with the text of the correctly transcribed term that is represented by the correct vector. The replacement may be based on the comparison.

Another aspect of the present disclosure relates to a system configured for generating disambiguated terms in automatically generated transcriptions including instructions within a particular knowledge domain. The system may include one or more hardware processors configured by machine-readable instructions. The machine-readable instructions may include one or more computer program components. The computer program components may include one or more of set obtaining component, indication obtaining component, vector generation model, training component, and/or other components.

The set obtaining component may be configured to obtain a set of transcripts automatically generated from audio dictations including instructions within the particular knowledge domain representing various speech from users. The set of transcripts resulted from automatic speech recognition. The individual transcripts may include transcribed terms automatically derived from the audio dictations as textual representations of spoken terms in the audio dictations. The transcribed terms may include instances of a first correctly transcribed term that accurately represents a first spoken term and instances of a first incorrectly transcribed term that inaccurately represents the first spoken term. The first spoken term may be part of a lexicography of the knowledge domain.

The indication obtaining component may be configured to obtain indications of correlated correct and incorrect transcriptions of spoken terms within the knowledge domain. Indication may be obtained of correlation of the first correctly transcribed term and the first incorrectly transcribed term.

The training component may be configured to obtain a vector generation model that generates vectors for individual instances of the transcribed terms in the set of transcripts that are part of the lexicography of the knowledge domain. The vectors numerically may represent the text of the transcribed terms and contexts of the instances of the transcribed terms. The training component may be configured to use the vector generation model.

The vector generation model may be configured to generate the vectors. The vector generation model may be configured to generate a first set of vectors that represent the instances of the first correctly transcribed term. Such vectors may numerically represent the text of the first correctly transcribed term and different contexts of the individual instances of the first correctly transcribed term. The first set of vectors may include a first vector that numerically represents the text of the first correctly transcribed term and the context of a first instance of the first correctly transcribed term.

The vector generation model may be configured to generate a second set of vectors that represent the instances of the first incorrectly transcribed term. Such vectors numerically represent the text of the first incorrectly transcribed term and different contexts of the individual instances of the first incorrectly transcribed term. The second set of vectors may include a second vector that numerically represents the text of the first incorrectly transcribed term and the context of a first instance of the first incorrectly transcribed term.

The training component may be configured to train the vector generation model to reduce spatial separation of vectors generated for instances of correlated correct and incorrect transcriptions of spoken terms within the knowledge domain. Training the vector generation model may cause a spatial separation of the first vector and the second vector to be reduced.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

BRIEF DESCRIPTION OF THE DRAWINGS

FIG. 3 illustrates a method for generating disambiguated terms in automatically generated transcriptions including instructions within a particular knowledge domain, in accordance with one or more implementations.

DETAILED DESCRIPTION

Figure 1:
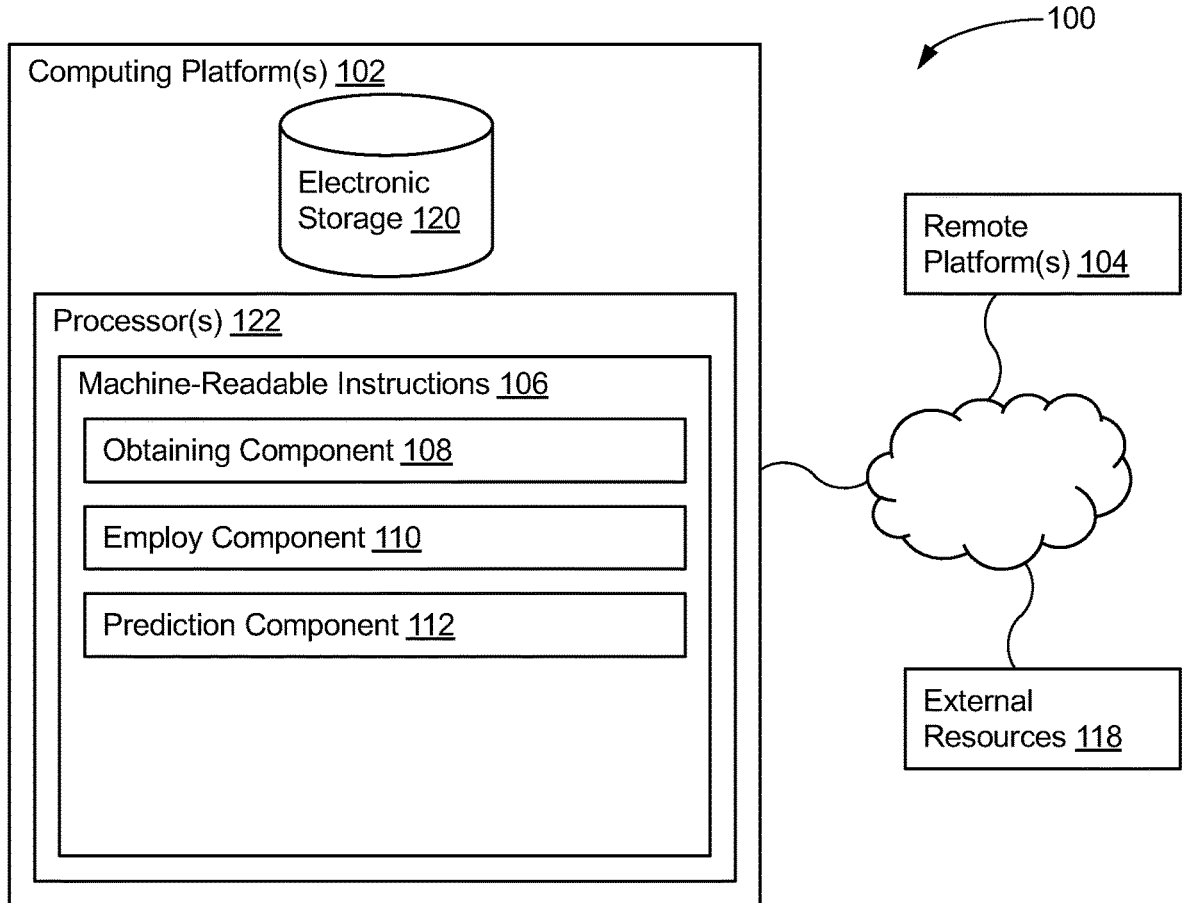
FIG. 1 illustrates a system for utilizing a term prediction model to predict a spoken term based on a mistranscription of the spoken term, in accordance with one or more implementations.

FIG. 1 illustrates a system 100 configured for utilizing a term prediction model to predict a spoken term based on a mistranscription of the spoken term, in accordance with one or more implementations. The term prediction model may be the same as or similar to system 200, in accordance with one or more implementations.

In some implementations, system 100 may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may be configured by machine-readable instructions 106. Machine-readable instructions 106 may include one or more instruction components. The instruction components may include computer program components. The instruction components may include one or more of an obtaining component 108, employ component 110, prediction component 112, and/or other components.

Obtaining component 108 may be configured to obtain a transcript automatically generated from audio dictation of a user. The transcript resulted from automatic speech recognition (ASR). The transcript may include instances of transcribed terms automatically derived from the audio dictation as textual representations of spoken terms in the audio dictation. The transcribed terms may include an instance of an incorrectly transcribed term that inaccurately represents a spoken term.

Figure 4A:
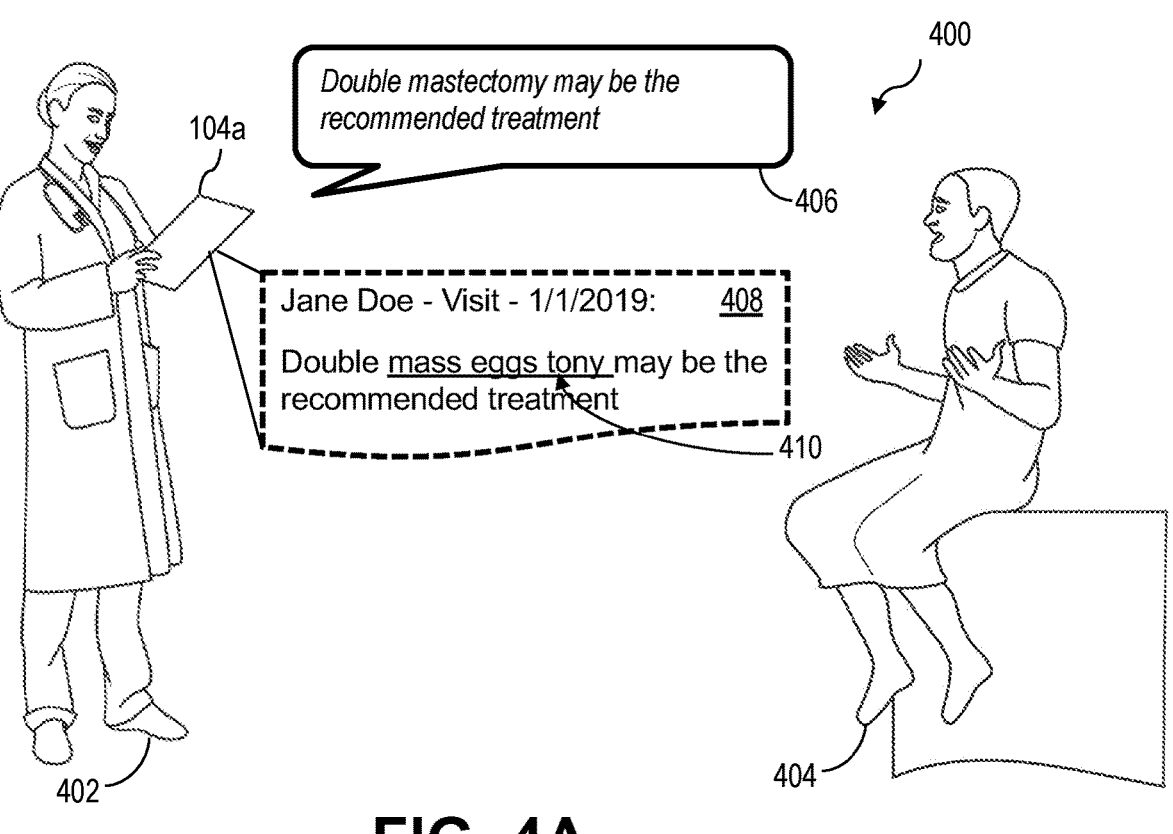
FIG. 4A-D illustrates an example implementation of the system described herein, in accordance with one or more implementations.

FIG. 4A-D illustrate an example implementation of system 100 and system 200 described herein, in accordance with one or more implementations. FIG. 4A may illustrate scenario 400 including recording information during an appointment and interfaces presenting the information. Scenario 400 may include doctor 402 (i.e., recording user), and patient 404. Doctor 402 may dictate audio 406 into mobile tablet 104a. Based on audio 406, transcript 408 may be generated mistakenly interpreting "mastectomy" as "mass eggs tony" (i.e., an instance of an incorrectly transcribed term that inaccurately represents a spoken term) and thus include mistranscription 410.

Referring back to system 100, obtaining component 108 may be configured to facilitate communication with system 200 (i.e., the term prediction model). System 200 may train a model to generate disambiguated terms in automatically generated transcriptions including instructions within a particular knowledge domain. Regarding the example implementation of FIG. 4, "mass eggs tony" may be disambiguated. Communication with system 200 may be via thumb drive, wireless connection through a network, and/or other modes that facilitate communication.

Figure 2:
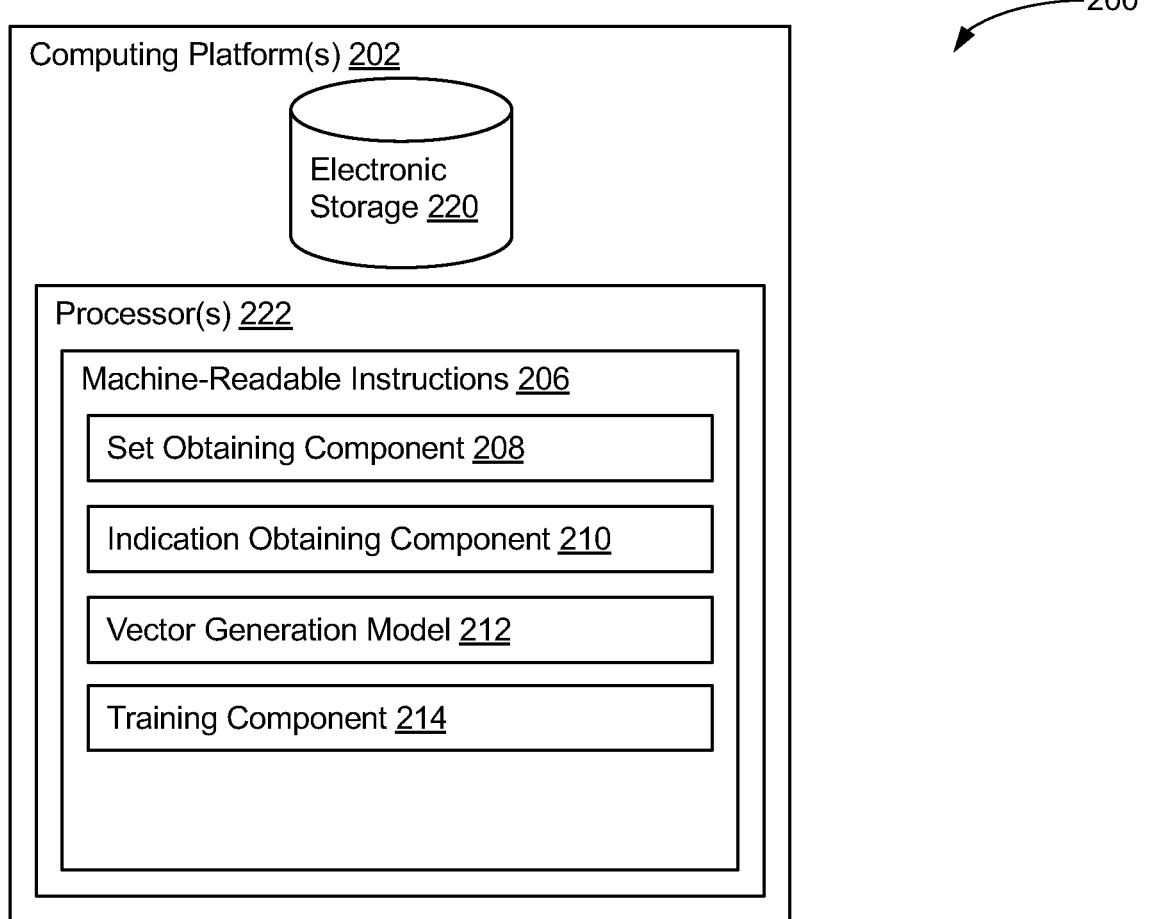
FIG. 2 illustrates a system configured for generating disambiguated terms in automatically generated transcriptions including instructions within a particular knowledge domain, in accordance with one or more implementations.

FIG. 2 illustrates a system 200 configured for generating disambiguated terms in automatically generated transcriptions including instructions within a particular knowledge domain, in accordance with one or more implementations. In some implementations, system 200 may include one or more servers 202.

Server(s) 202 may be configured by machine-readable instructions 206. Machine-readable instructions 206 may include one or more instruction components. The instruction components may include computer program components. The instruction components may include one or more of set obtaining component 208, indication obtaining component 210, vector generation model 212, training component 214, and/or other instruction components.

Set obtaining component 208 may be configured to obtain a set of transcripts automatically generated from audio dictations including instructions within the particular knowledge domain representing various speech from users. By way of non-limiting example, the set of transcripts may include notes of the users (e.g., notes derived from audio dictations of the users), books (e.g., medical textbooks, auto manuals), articles (e.g., research articles, clinical trial reports, case reports, review articles, etc.), transcribed lectures, and/or other transcripts. By way of non-limiting example, the particular knowledge domain may include medical field, automotive field, law and law enforcement, civil engineering, and/or other knowledge domains. Some of the set of transcripts may result from automatic speech recognition (ASR). The individual transcripts may include transcribed terms automatically derived from the audio dictations as textual representations of spoken terms in the audio dictations. The spoken terms may include words and/or phrases. The spoken terms may include phoneme groups of one or more phonemes that are smaller than a word. The transcribed terms may include instances of a first correctly transcribed term that accurately represents a first spoken term. The transcribed terms may include instances of a first incorrectly transcribed term that inaccurately represents the first spoken term.

Indication obtaining component 210 may be configured to obtain indications of correlated correct and incorrect transcriptions of spoken terms within the knowledge domain. In other words, indication is obtained of correlation of the first correctly transcribed term and the first incorrectly transcribed term. Correlation may signify that the first correctly transcribed term and the first incorrectly transcribed term are the same term, have the same meaning, and/or both. Indications of correlated correct and incorrect transcriptions of spoken terms may be obtained from a review team of reviewing users who correct mistranscriptions in transcriptions based on playbacks of the audio dictations of the users and/or other modes of obtaining indications.

Figure 4B:
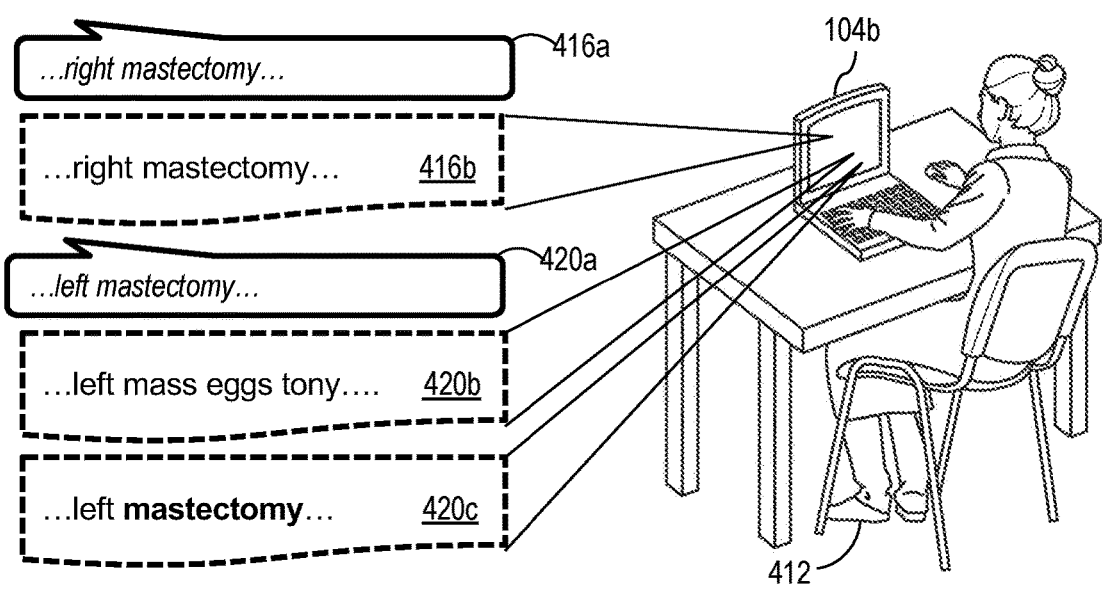

Referring to FIG. 4B, a set of transcripts, including 416b and 420b, may be derived from audio dictations 416a and 420a respectively, of doctor 402. The set of transcripts may include both transcribed terms "mastectomy" and "mass eggs tony". Indication may be obtained from reviewer 412 that "mass eggs tony" of transcript 420b is a mistranscription of "mastectomy" because reviewer 412 made a correction, via laptop 104b, to generate transcript 420c that includes "mastectomy". Thus, the correction is the indication of correlation between transcribed terms "mastectomy" and "mass eggs tony".

Referring back to FIG. 2, training component 214 may be configured to obtain vector generation model 212 that generates vectors. The vectors may be generated for individual instances of the transcribed terms in the set of transcripts that are part of the lexicography of the knowledge domain. The vectors may numerically represent the text of the transcribed terms and contexts of the instances of the transcribed terms. The contexts of the instances of the transcribed terms may include other terms in the individual transcripts, syntactic relationship with the instances of the first correctly transcribed term, and/or other contexts. By way of non-limiting example, in the medical knowledge domain, the contexts may include fundamental information about the user such as family disease, past medical history, prescriptions, gender, and/or other information. The first spoken term may be part of a lexicography of the knowledge domain.

Training component 214 may be configured to use the vector generation model 212 to generate the vectors. A first set of vectors may be generated that represent the instances of the first correctly transcribed term. The first set of vectors may numerically represent the text of the first correctly transcribed term and different contexts of the individual instances of the first correctly transcribed term. The first set of vectors may include a first vector that numerically represents the text of the first correctly transcribed term and the context of a first instance of the first correctly transcribed term.

Training component 214 may be configured to use vector generation model 212 to generate a second set of vectors that represent the instances of the first incorrectly transcribed term. The second set of vectors may numerically represent the text of the first incorrectly transcribed term and different contexts of the individual instances of the first incorrectly transcribed term. The second set of vectors may include a second vector that numerically represents the text of the first incorrectly transcribed term and the context of a first instance of the first incorrectly transcribed term.

Figure 4C:
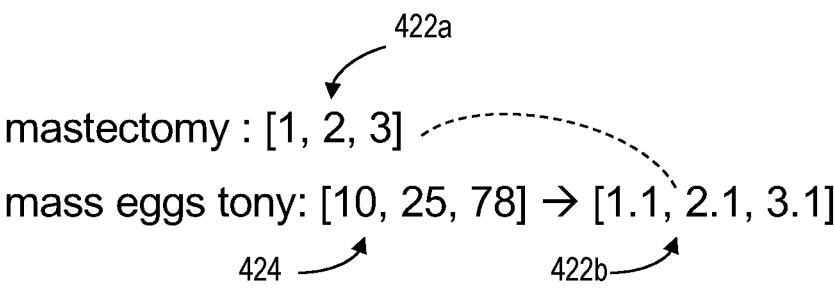

Referring to FIG. 4C, vector 422a may represent correctly transcribed term "mastectomy". Vector 424 may represent incorrectly transcribed term "mass eggs tony".

Referring to back to FIG. 2, training component 214 may be configured to train vector generation model 212 to reduce spatial separation of vectors generated for instances of correlated correct and incorrect transcriptions of spoken terms within the knowledge domain. Training vector generation model 212 may cause a spatial separation of the first vector and the second vector to be reduced. Reducing spatial separation may include operations (e.g., addition, subtraction, multiplication, division, etc.) that adjust a vector (e.g., the second vector) to parallel or analogize to another vector (e.g., the first vector). Trivial or reduced spatial separation of the first vector and the second vector may indicate that the text of the transcribed terms that the first vector and the second vector represent are the same or similar. On the contrary, sizable spatial separation of the first vector and the second vector may indicate that the text of the transcribed terms that the first vector and the second vector represent are distinct.

Training vector generation model 212 may include determining co-occurrence probability between the instances of a first correctly transcribed term and other transcribed terms that are part of the lexicography of the domain, determining mutual information between the instances of a first correctly transcribed term and other transcribed terms that are part of the lexicography of the domain, and/or other determinations that may train vector generation model 212 to reduce spatial separation of vectors generated for instances of correlated correct and incorrect transcriptions of spoken terms.

Referring back to FIG. 4C, vector 422b may result from training to reduce spatial separation of vector 422a and 424 and indicate that the text vector 422*b* represents, "mass eggs tony", is the same or similar to the text 422*a* represents, "mastectomy".

Functions executed by the components of system 200 may occur prior to execution of system 100 such that system 200 trains the model prior to employment of the model. Upon training, the model may be stored to electronic storage 220. Upon any further training, the model may be re-stored and/or updated to electronic storage 220.

Referring back to FIG. 1, employ component 110 may be configured to employ the model trained by system 200 (i.e., the term prediction model). The trained model may generate, via system 200, a primary vector that numerically represents the text of the incorrectly transcribed term of the transcript and context of the instance of the incorrectly transcribed term (e.g., vector 424 of FIG. 4C).

Employ component 110 may be configured to obtain the first set of vectors that represent text of transcribed terms of the context of the instance of the first incorrectly transcribed term. The first set of vectors may have been generated by obtained vector generation model 212 and used by system 200. The first set of vectors may be obtained from the model trained by system 200. The first set of vectors may include a correct vector that numerically represents the text of a correctly transcribed term of the spoken term (e.g., vector 422*a* of FIG. 4C). The correct vector of the first set of vectors may be the same as the first vector.

Prediction component 112 may be configured to compare the primary vector and the correct vector to determine the primary vector correlates to the correct vector. The comparison may occur upon reduction of spatial separation of the primary vector and the correct vector via the model trained by system 200 such that the disambiguated terms are generated (e.g., vector 422*b* of FIG. 4C). The primary vector may be similar to or the same as the second vector.

As previously mentioned, reduction of spatial separation of the primary vector and the correct vector via system 200 is based on system 200 obtaining the set of transcripts automatically generated from audio dictations including instructions within the particular knowledge domain representing various speech from users. The set of transcripts resulted from automatic speech recognition, the individual transcripts including transcribed terms automatically derived from the audio dictations as textual representations of spoken terms in the audio dictations. The transcribed terms may include instances of the correctly transcribed term that accurately represents the spoken term and instances of the incorrectly transcribed term that inaccurately represents the spoken term. The spoken term being part of the lexicography of the knowledge domain.

As previously mentioned, reduction of spatial separation of the primary vector and the correct vector via system 200 is based on the term prediction model obtaining an indication of correlated correct and incorrect transcriptions of the spoken term with the particular knowledge domain. Indication is obtained of the correlation of the correctly transcribed term and the incorrectly transcribed term.

Prediction component 112 may be configured to store the correlation between the primary vector and the correct vector. The correlations may be stored to electronic storage 120. Such stored correlation may direct future instances of the incorrectly transcribed term to the correct vector to determine the intent of the incorrectly transcribed term.

Prediction component 112 may be configured to utilize the correlation between the primary vector and the correct vector in instances of the incorrectly transcribed term. The utilization may be based on the comparison of the primary vector and the correct vector that determine the primary vector correlates to the correct vector. The primary vector correlating to the correct vector indicates the text of the transcribed term that is represented by the primary vector is the same as or similar to the text of the transcribed term that is represented by the correct vector.

Utilizing the correlation in instances of the incorrectly transcribed term may include implementing the incorrectly transcribed term, the correctly transcribed term, or some other term that represents a syntactical meaning shared by the incorrectly transcribed term and the correctly transcribed term to infer intent of the user (e.g., author or speaker) of the incorrectly transcribed term. This may include substituting the text of the incorrectly transcribed term and/or of the other term that represents the shared syntactical meaning in text to be presented to the user or other users, in a command executed by system 100, and/or in other contexts. Utilizing the text of the correctly transcribed term (or the meaning thereof) may enhance accuracy and/or precision of system 100 in inferring intent of the user of the incorrectly transcribed term. Such enhanced accuracy and/or precision may enhance operation of system 100 in taking any number of actions based on the transcription and/or other textual content in which the incorrectly transcribed term appears. In some implementations, the substitution of the incorrectly transcribed term for the correctly transcribed term by prediction component 112 may be internal to system 100. That is, prediction component 112 may make a substitution or co-use of the incorrectly transcribed term for or with the correctly transcribed term in a way that is not conveyed to any user (e.g., a substitution is not conveyed through any user interface, but instead the incorrectly transcribed term is left in the text presented). In some implementations, prediction component 112 may cause transmission of the correlation between the primary vector and the correct vector to another system.

Utilizing the correlation in instances of the incorrectly transcribed term may include replacing the instance of the incorrectly transcribed term with the text of the correctly transcribed term that is represented by the correct vector such that the transcript is updated when presented to the user or other users. The replacement does not change the significance of the transcript but clarifies the implied meaning of the transcript. The transcript, upon replacement, may be stored to electronic storage 120 such that users (e.g., other personnel) may access the transcript.

Figure 4D:
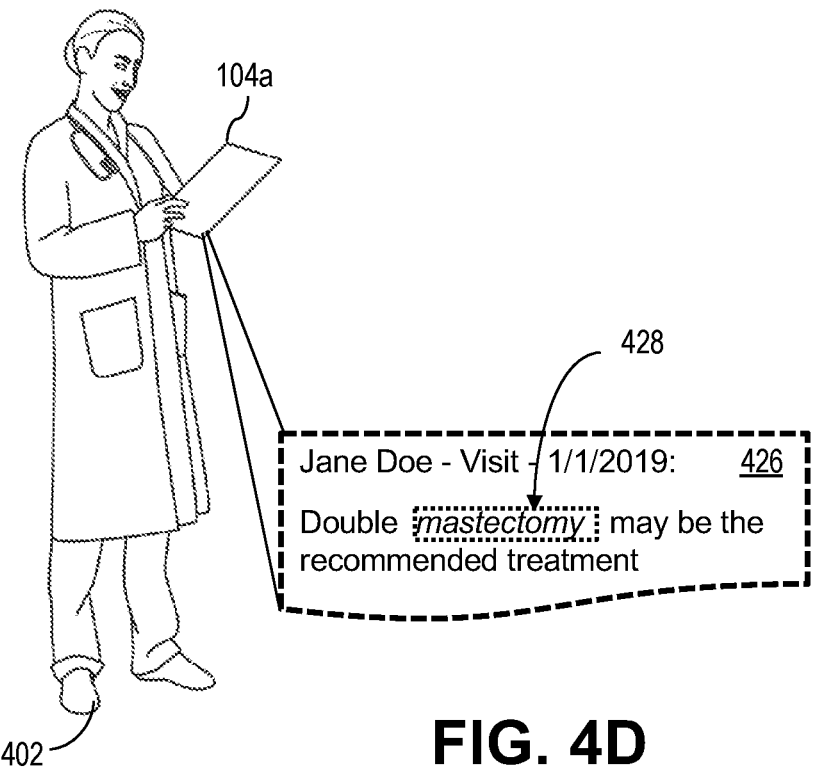

Concluding the example illustrated in FIG. 4A-D, FIG. 4D illustrates transcript 426 reflecting replacement of the incorrectly transcribed term 410 ("mass eggs tony") to the correctly transcribed term correlated to term 428 ("mastectomy"). It is to be understood that the replacement illustrated in the FIG. 4D is an example of one of the ways to utilize the correlation and is not intended to be limiting.

In some implementations, server(s) 102, client computing platform(s) 104, and/or external resources 118 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 118 may be operatively linked via some other communication media.

A given client computing platform 104 may include one or more processors configured to execute computer program components. The computer program components may be configured to enable an expert or user associated with the given client computing platform 104 to interface with system 100 and/or external resources 118, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms. By interfacing with system 100, the one or more processors configured to execute the computer program modules of the given client computing platform 104 may improve functionality of the given client computing platform 104 such that the given client computing platform 104 functions more than a generic client computing platform thereon out. Upon interfacing with system 100, a computer-automated process may be established and/or improved of the given client computing platform 104.

External resources 118 may include sources of information outside of system 100, external entities participating with system 100, and/or other resources. In some implementations, some or all of the functionality attributed herein to external resources 118 may be provided by resources included in system 100.

Server(s) 102 may include electronic storage 120, one or more processors 122, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 120 may comprise non-transitory storage media that electronically stores information. The electronic storage media of electronic storage 120 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 120 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 120 may include one or more virtual storage resources (e.g., cloud storage, a virtual private network, and/or other virtual storage resources). Electronic storage 120 may store software algorithms, information determined by processor(s) 122, information received from server(s) 102, information received from client computing platform(s) 104, and/or other information that enables server(s) 102 to function as described herein.

Processor(s) 122 may be configured to provide information processing capabilities in server(s) 102. As such, processor(s) 122 may include one or more of a digital processor, an analog processor, a digital circuit designed to process information, an analog circuit designed to process information, a state machine, and/or other mechanisms for electronically processing information. These mechanisms for electronically processing information that may serve as processor(s) 122 may transforms and/or improve server(s) 102 such that server(s) 102 function to accomplish a specific purpose. Although processor(s) 122 is shown in FIG. 1 as a single entity, this is for illustrative purposes only. In some implementations, processor(s) 122 may include a plurality of processing units. These processing units may be physically located within the same device, or processor(s) 122 may represent processing functionality of a plurality of devices operating in coordination. Processor(s) 122 may be configured to execute components 108, 110, and/or 112, and/or other components. Processor(s) 122 may be configured to execute components 108, 110, and/or 112, and/or other components by software; hardware; firmware; some combination of software, hardware, and/or firmware; and/or other mechanisms for configuring processing capabilities on processor(s) 122. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, and/or 112 are illustrated in FIG. 1 as being implemented within a single processing unit, in implementations in which processor(s) 122 includes multiple processing units, one or more of components 108, 110, and/or 112 may be implemented remotely from the other components. The description of the functionality provided by the different components 108, 110, and/or 112 described below is for illustrative purposes, and is not intended to be limiting, as any of components 108, 110, and/or 112 may provide more or less functionality than is described. For example, one or more of components 108, 110, and/or 112 may be eliminated, and some or all of its functionality may be provided by other ones of components 108, 110, and/or 112. As another example, processor(s) 122 may be configured to execute one or more additional components that may perform some or all of the functionality attributed below to one of components 108, 110, and/or 112.

Server(s) 202 may include electronic storage 220, one or more processors 222, and/or other components. Server(s) 202 may include communication lines, or ports to enable the exchange of information with a network and/or other computing platforms. Illustration of server(s) 202 in FIG. 2 is not intended to be limiting. Server(s) 202 may include a plurality of hardware, software, and/or firmware components operating together to provide the functionality attributed herein to server(s) 202. For example, server(s) 202 may be implemented by a cloud of computing platforms operating together as server(s) 202.

Electronic storage 220 may comprise non-transitory storage media that electronically stores information. The electronic storage media of electronic storage 220 may include one or both of system storage that is provided integrally (i.e., substantially non-removable) with server(s) 202 and/or removable storage that is removably connectable to server(s) 202 via, for example, a port (e.g., a USB port, a firewire port, etc.) or a drive (e.g., a disk drive, etc.). Electronic storage 220 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 220 may include one or more virtual storage resources (e.g., cloud storage, a virtual private network, and/or other virtual storage resources). Electronic storage 220 may store software algorithms, information determined by processor(s) 222, information received from server(s) 202, and/or other information that enables server(s) 202 to function as described herein.

Processor(s) 222 may be configured to provide information processing capabilities in server(s) 202. As such, processor(s) 222 may include one or more of a digital processor, an analog processor, a digital circuit designed to process information, an analog circuit designed to process information, a state machine, and/or other mechanisms for electronically processing information. These mechanisms for electronically processing information that may serve as processor(s) 222 may transforms and/or improve server(s) 202 such that server(s) 202 function to accomplish a specific purpose. Although processor(s) 222 is shown in FIG. 2 as a single entity, this is for illustrative purposes only. In some implementations, processor(s) 222 may include a plurality of processing units. These processing units may be physically located within the same device, or processor(s) 222 may represent processing functionality of a plurality of devices operating in coordination. Processor(s) 222 may be configured to execute components 208, 210, 212, and/or 214, and/or other components. Processor(s) 222 may be configured to execute components 208, 210, 212, and/or 214, and/or other components by software; hardware; firmware; some combination of software, hardware, and/or firmware; and/or other mechanisms for configuring processing capabilities on processor(s) 222. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 208, 210, 212, and/or 214 are illustrated in FIG. 2 as being implemented within a single processing unit, in implementations in which processor(s) 222 includes multiple processing units, one or more of components 208, 210, 212, and/or 214 may be implemented remotely from the other components. The description of the functionality provided by the different components 208, 210, 212, and/or 214 described below is for illustrative purposes, and is not intended to be limiting, as any of components 208, 210, 212, and/or 214 may provide more or less functionality than is described. For example, one or more of components 208, 210, 212, and/or 214 may be eliminated, and some or all of its functionality may be provided by other ones of components 208, 210, 212, and/or 214. As another example, processor(s) 222 may be configured to execute one or more additional components that may perform some or all of the functionality attributed below to one of components 208, 210, 212, and/or 214.

FIG. 3 illustrates a method 300 for generating disambiguated terms in automatically generated transcriptions including instructions within a particular knowledge domain, in accordance with one or more implementations. The operations of method 300 presented below are intended to be illustrative. In some implementations, method 300 may be accomplished with one or more additional operations not described, and/or without one or more of the operations discussed. Additionally, the order in which the operations of method 300 are illustrated in FIG. 3 and described below is not intended to be limiting.

In some implementations, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

An operation 302 may include obtaining a set of transcripts automatically generated from audio dictations including instructions within the particular knowledge domain representing various speech from users. The set of transcripts resulted from automatic speech recognition. The individual transcripts may include transcribed terms automatically derived from the audio dictations as textual representations of spoken terms in the audio dictations. The transcribed terms may include instances of a first correctly transcribed term that accurately represents a first spoken term and instances of a first incorrectly transcribed term that inaccurately represents the first spoken term. The first spoken term may be part of a lexicography of the knowledge domain. Operation 302 may be performed by one or more hardware processors configured by machine-readable instructions including a component that is the same as or similar to set obtaining component 208, in accordance with one or more implementations.

An operation 304 may include obtaining indications of correlated correct and incorrect transcriptions of spoken terms within the knowledge domain such that indication is obtained of correlation of the first correctly transcribed term and the first incorrectly transcribed term. Operation 304 may be performed by one or more hardware processors configured by machine-readable instructions including a component that is the same as or similar to indication obtaining component 210, in accordance with one or more implementations.

An operation 306 may include obtaining a vector generation model that generates vectors for individual instances of the transcribed terms in the set of transcripts that are part of the lexicography of the knowledge domain. The vectors numerically may represent the text of the transcribed terms and contexts of the instances of the transcribed terms. Operation 306 may be performed by one or more hardware processors configured by machine-readable instructions including a component that is the same as or similar to training component 214 and vector generation model 212, in accordance with one or more implementations.

An operation 308 may include using the vector generation model to generate a first set of vectors that represent the instances of the first correctly transcribed term. Such vectors numerically representing the text of the first correctly transcribed term and different contexts of the individual instances of the first correctly transcribed term. The first set of vectors may include a first vector that numerically represents the text of the first correctly transcribed term and the context of a first instance of the first correctly transcribed term. Operation 308 may be performed by one or more hardware processors configured by machine-readable instructions including a component that is the same as or similar to training component 214 and vector generation model 212, in accordance with one or more implementations.

An operation 310 may include using the vector generation model to generate a second set of vectors that represent the instances of the first incorrectly transcribed term. Such vectors numerically representing the text of the first incorrectly transcribed term and different contexts of the individual instances of the first incorrectly transcribed term. The second set of vectors may include a second vector that numerically represents the text of the first incorrectly transcribed term and the context of a first instance of the first incorrectly transcribed term. Operation 310 may be performed by one or more hardware processors configured by machine-readable instructions including a component that is the same as or similar to training component 214 and vector generation model 212, in accordance with one or more implementations.

An operation 312 may include training the vector generation model to reduce spatial separation of vectors generated for instances of correlated correct and incorrect transcriptions of spoken terms within the knowledge domain such that training the vector generation model causes a spatial separation of the first vector and the second vector to be reduced. Operation 312 may be performed by one or more hardware processors configured by machine-readable instructions including a component that is the same as or similar to training component 214 and vector generation model 212, in accordance with one or more implementations.

Figure 5:
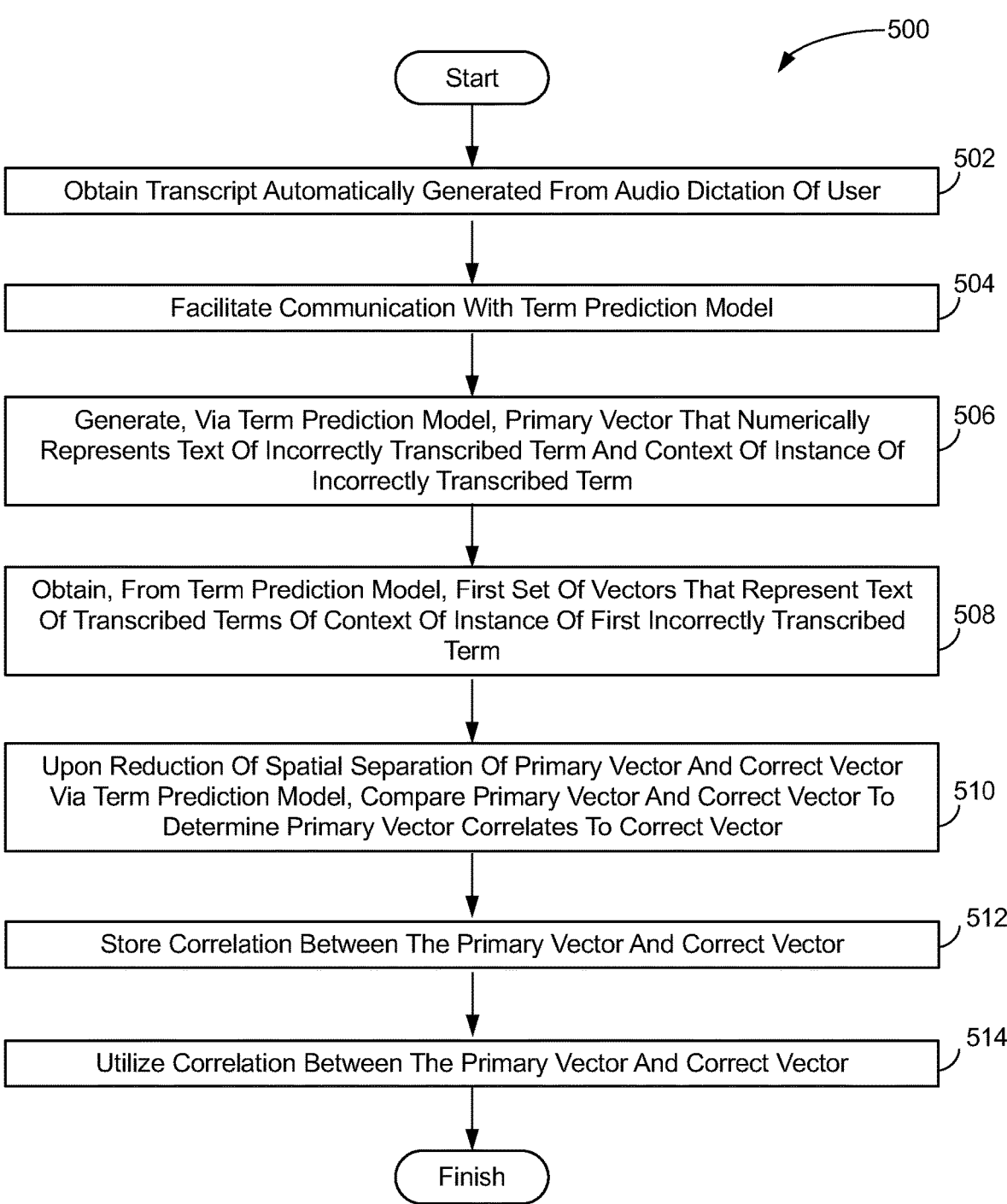
FIG. 5 illustrates a method for utilizing a term prediction model to predict a spoken term based on a mistranscription of the spoken term, in accordance with one or more implementations.

FIG. 5 illustrates a method 500 for utilizing a term prediction model to predict a spoken term based on a mistranscription of the spoken term, in accordance with one or more implementations. The operations of method 500 presented below are intended to be illustrative. In some implementations, method 500 may be accomplished with one or more additional operations not described, and/or without one or more of the operations discussed. Additionally, the order in which the operations of method 500 are illustrated in FIG. 5 and described below is not intended to be limiting.

An operation 502 may include obtaining a transcript automatically generated from audio dictation of a user. The transcript may have resulted from automatic speech recognition. The transcript may include instances of transcribed terms automatically derived from the audio dictation as textual representations of spoken terms in the audio dictation, the transcribed terms including an instance of an incorrectly transcribed term that inaccurately represents a spoken term. Operation 502 may be performed by one or more hardware processors configured by machine-readable instructions including a component that is the same as or similar to obtaining component 108, in accordance with one or more implementations.

An operation 504 may include facilitating communication with the term prediction model. The term prediction model configured to generate disambiguated terms in automatically generated transcriptions including instructions within a particular knowledge domain. Operation 504 may be performed by one or more hardware processors configured by machine-readable instructions including a component that is the same as or similar to obtaining component 108, in accordance with one or more implementations.

An operation 506 may include generating, via the term prediction model, a primary vector that numerically represents the text of the incorrectly transcribed term and context of the instance of the incorrectly transcribed term. Operation 506 may be performed by one or more hardware processors configured by machine-readable instructions including a component that is the same as or similar to employ component 110 to employ a trained model, in accordance with one or more implementations.

An operation 508 may include obtaining, from the term prediction model, a first set of vectors that represent text of transcribed terms of the context of the instance of the first incorrectly transcribed term. The first set of vectors may include a correct vector that numerically represents the text of a correctly transcribed term of the spoken term. Operation 508 may be performed by one or more hardware processors configured by machine-readable instructions including a component that is the same as or similar to employ component 110, in accordance with one or more implementations.

An operation 510 may include comparing the primary vector and the correct vector to determine the primary vector correlates to the correct vector. The comparison may be upon reduction of spatial separation of the primary vector and the correct vector via the term prediction model. Operation 510 may be performed by one or more hardware processors configured by machine-readable instructions including a component that is the same as or similar to prediction component 112, in accordance with one or more implementations.

An operation 512 may include storing the correlation between the primary vector and the correct vector. Operation 512 may be performed by one or more hardware processors configured by machine-readable instructions including a component that is the same as or similar to prediction component 112, in accordance with one or more implementations.

An operation 514 may include utilizing the correlation between the primary vector and the correct vector in instances of the incorrectly transcribed term. Operation 514 may be performed by one or more hardware processors configured by machine-readable instructions including a component that is the same as or similar to prediction component 112, in accordance with one or more implementations.

In some implementations, method 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to generate disambiguated terms in automatically generated transcripts, the system comprising:
   one or more processors configured by machine-readable instructions to:
      obtain a set of transcripts that include transcribed terms as textual representations of spoken terms, wherein the transcribed terms include correctly transcribed terms and inaccurately transcribed terms, wherein the inaccurately transcribed terms refer to the correctly transcribed terms such that the inaccurately transcribed terms and the correctly transcribed terms have the same intended meaning by a speaker that provided the spoken terms;

obtain indications of correlated correct transcripts of spoken terms and inaccurate transcripts of the spoken terms;

use a vector generation model to generate vectors for individual instances of the correctly transcribed terms and individual instances of the inaccurately transcribed terms in the set of transcripts based on text of individual ones of the transcribed terms and contexts of instances of the individual ones of the transcribed terms such that the vectors numerically represent the text of the transcribed terms and the contexts of the instances of the transcribed terms; and train the vector generation model to reduce spatial separation of the vectors generated for the spoken terms in the correlated correct transcripts and the inaccurate transcripts.

2. The system of claim 1, wherein the spoken terms include words and/or phrases.

3. The system of claim 1, wherein the spoken terms include phoneme groups of one or more phonemes that are smaller than a word.

4. The system of claim 1, wherein the set of transcripts include one or more of notes of users, books, articles, or transcribed lectures.

5. The system of claim 1, wherein the contexts of the instances of the transcribed terms include other terms in individual transcripts and/or syntactic relationships.

6. The system of claim 1, wherein training the vector generation model includes determining co-occurrence probability between the instances of individual ones of the correctly transcribed terms and other transcribed terms.

7. The system of claim 1, wherein training the vector generation model includes determining mutual information between the instances of individual ones of the correctly transcribed terms and other transcribed terms.

8. A system configured to utilize a term prediction model to predict a spoken term based on a mistranscription of the spoken term, the system comprising:

electronic storage that stores a term prediction model configured to generate disambiguated terms in automatically generated transcripts; and one or more processors configured by machine-readable instructions to:

obtain a transcript of speech of a user, the transcript including instances of transcribed terms of spoken terms by the user, the transcribed terms including one or more instances of an inaccurately transcribed term that inaccurately represents a spoken term provided by the user;

employ the term prediction model to generate one or more vectors that numerically represent text of the inaccurately transcribed term and individual contexts of the one or more instances of the inaccurately transcribed term;

obtain, from the term prediction model, one or more sets of vectors that represent text of terms in contexts that are the same as the individual contexts of the one or more instances of the inaccurately transcribed term, wherein individual ones of the one or more sets of vectors include a correct vector that numerically represents the text of a correctly transcribed term of the spoken term, wherein the term prediction model reduces spatial separation of the individual ones of the one or more vectors and the correct vector included in the individual ones of the one or more sets of vectors;

compare the individual ones of the one or more vectors and the correct vector included in the individual ones of the one or more sets of vectors to determine that the individual ones of the one or more vectors correlate to the correct vector;

store individual correlations; and utilize, based on comparison, the individual correlations to modify the transcript to include the correctly transcribed term.

9. The system of claim 8, wherein reduction of spatial separation via the term prediction model is based on the term prediction model obtaining a set of other transcripts that include transcribed terms as textual representations of spoken terms, the transcribed terms including instances of the correctly transcribed term that accurately represents the spoken term and instances of the inaccurately transcribed term that inaccurately represents the spoken term.

10. The system of claim 9, wherein reduction of spatial separation via the term prediction model is based on the term prediction model obtaining an indication of correlated correct transcripts of spoken terms and inaccurate transcripts of the spoken terms, wherein the spoken terms include the spoken term, such that an indication is obtained of correlation of the correctly transcribed term and the inaccurately transcribed term.

11. A method for generating disambiguated terms in automatically generated transcripts, the method comprising:

obtaining a set of transcripts that include transcribed terms as textual representations of spoken terms, wherein the transcribed terms include correctly transcribed terms and inaccurately transcribed terms, wherein the inaccurately transcribed terms refer to the correctly transcribed terms such that the inaccurately transcribed terms and the correctly transcribed terms have the same intended meaning by a speaker that provided the spoken terms;

obtaining indications of correlated correct transcripts of spoken terms and inaccurate transcripts of the spoken terms;

using a vector generation model to generate vectors for individual instances of the correctly transcribed terms and individual instances of the inaccurately transcribed terms in the set of transcripts based on text of individual ones of the transcribed terms and contexts of instances of the individual ones of the transcribed terms, such that the vectors numerically represent the text of the transcribed terms and the contexts of the instances of the transcribed terms; and training the vector generation model to reduce spatial separation of the vectors generated for the spoken terms in the correlated correct transcripts and inaccurate transcripts.

12. The method of claim 11, wherein the spoken terms include words and/or phrases.

13. The method of claim 11, wherein the spoken terms include phoneme groups of one or more phonemes that are smaller than a word.

14. The method of claim 11, wherein the set of transcripts include one or more of notes of users, books, articles, or transcribed lectures.

15. The method of claim 11, wherein the contexts of the instances of the transcribed terms include other terms in individual transcripts and/or syntactic relationships.

16. The method of claim 11, wherein the training of the vector generation model includes determining co-occurrence probability between the instances of individual ones of the correctly transcribed terms and other transcribed terms.

17. The method of claim 11, wherein the training of the vector generation model includes determining mutual information between the instances of individual ones of the correctly transcribed terms and other transcribed terms.

18. A method configured to utilize a term prediction model to predict a spoken term based on a mistranscription of the spoken term, the method comprising:

obtaining a transcript of speech of a user, the transcript including instances of transcribed terms of spoken terms by the user, the transcribed terms including one or more instances of an inaccurately transcribed term that inaccurately represents a spoken term provided by the user;

employing the term prediction model to generate one or more vectors that numerically represent text of the inaccurately transcribed term and individual contexts of the one or more instances of the inaccurately transcribed term, wherein the term prediction model is stored in electronic storage;

obtaining, from the term prediction model, one or more sets of vectors that represent text of terms in contexts that are the same as the individual contexts of the one or more instances of the inaccurately transcribed term, wherein individual ones of the one or more sets of vectors include a correct vector that numerically represents the text of a correctly transcribed term of the spoken term, wherein the term prediction model reduces spatial separation of the individual ones of the one or more vectors and the correct vector included in the individual ones of the one or more sets of vectors;

comparing the individual ones of the one or more vectors and the correct vector to determine the individual ones of the one or more vectors correlate to the correct vector;

storing individual correlations; and utilizing, based on comparison, the individual correlations to modify the transcript to include the correctly transcribed term.

19. The method of claim 18, wherein reduction of spatial separation via the term prediction model is based on the term prediction model obtaining a set of other transcripts that include transcribed terms as textual representations of spoken terms, the transcribed terms including instances of the correctly transcribed term that accurately represents the spoken term and instances of the inaccurately transcribed term that inaccurately represents the spoken term.

20. The method of claim 19, wherein reduction of spatial separation via the term prediction model is based on the term prediction model obtaining an indication of correlated correct transcripts of spoken terms and inaccurate transcripts of the spoken terms, wherein the spoken terms include the spoken term such that an indication is obtained of correlation of the correctly transcribed term and the inaccurately transcribed term.

* * * * *